United States Patent
Robson et al.

(10) Patent No.: US 9,982,730 B2
(45) Date of Patent: May 29, 2018

(54) BRAKE PAD

(71) Applicant: Nissan North America, Inc., Franklin, TN (US)

(72) Inventors: Paul Robson, Milford, MI (US); Scott Warnecke, Brighton, MI (US)

(73) Assignee: Nissan North America, Inc., Franklin, TN (US)

( * ) Notice: Subject to any disclaimer, the term of this patent is extended or adjusted under 35 U.S.C. 154(b) by 3 days.

(21) Appl. No.: 15/188,690

(22) Filed: Jun. 21, 2016

(65) Prior Publication Data

US 2017/0363161 A1  Dec. 21, 2017

(51) Int. Cl.
| | |
|---|---|
| *F16D 65/00* | (2006.01) |
| *F16D 65/092* | (2006.01) |
| *F16D 55/225* | (2006.01) |
| *F16D 69/00* | (2006.01) |
| *F16D 69/02* | (2006.01) |

(52) U.S. Cl.
CPC ....... *F16D 65/0037* (2013.01); *F16D 65/092* (2013.01); *F16D 55/225* (2013.01); *F16D 69/02* (2013.01); *F16D 2069/005* (2013.01)

(58) Field of Classification Search
USPC .......................................... 188/257; D12/180
See application file for complete search history.

(56) References Cited

U.S. PATENT DOCUMENTS

| | | | | |
|---|---|---|---|---|
| 1,557,669 A | * | 10/1925 | De France | F16D 65/062 188/251 R |
| 1,626,403 A | * | 4/1927 | Gatke | F16D 69/02 188/259 |
| 2,251,410 A | * | 8/1941 | Koehring | B22F 7/04 188/251 M |
| 2,355,419 A | * | 8/1944 | Bruce | F16D 65/08 188/251 R |
| 2,359,361 A | * | 10/1944 | Gleszer | B22F 7/004 188/218 XL |
| 3,037,860 A | * | 6/1962 | Masterson | F16D 69/02 106/36 |
| 3,275,105 A | * | 9/1966 | Petit | F16D 65/0006 188/250 B |
| 3,390,750 A | * | 7/1968 | Albertson | F16D 69/02 188/251 M |
| 3,899,050 A | * | 8/1975 | Savary | F16D 65/0037 188/251 A |

(Continued)

*Primary Examiner* — Thomas J Williams
*Assistant Examiner* — James K Hsiao

(57) ABSTRACT

A brake pad has a brake lining with a first section and a second section. The first section includes a plurality of first layers having a first material and a plurality of second layers having a second material. The first material is different from the second material. The plurality of first layers and the plurality of second layers are alternatingly arranged between one another. The second section includes a plurality of third layers having the second material and a plurality of fourth layers having the first material. The plurality of third layers and the plurality of fourth layers are alternatingly arranged between one another. The plurality of first layers are adjacent to corresponding ones of the plurality of third layers are co-planar with one another. Further, the plurality of second layers are adjacent to corresponding ones of the plurality of fourth layers are co-planar with one another.

18 Claims, 12 Drawing Sheets

(56) References Cited

U.S. PATENT DOCUMENTS

| | | | | |
|---|---|---|---|---|
| D254,258 S | * | 2/1980 | Soltis | D12/180 |
| 4,315,563 A | * | 2/1982 | Hayashi | F16D 65/0006 188/250 G |
| 4,333,550 A | * | 6/1982 | Shirai | F16D 55/22 188/72.2 |
| 4,485,898 A | * | 12/1984 | Bracken | F16D 65/0006 188/250 B |
| 4,926,978 A | * | 5/1990 | Shibata | F16D 65/092 188/250 B |
| 5,099,962 A | * | 3/1992 | Furusu | F16D 65/0006 188/251 A |
| 5,163,526 A | * | 11/1992 | Morgun | F16D 65/0006 188/218 XL |
| 5,242,746 A | * | 9/1993 | Bommier | B32B 18/00 188/250 C |
| 5,474,159 A | * | 12/1995 | Soennecken | F16D 65/0037 188/250 B |
| 5,612,110 A | * | 3/1997 | Watremez | F16D 65/123 188/251 R |
| 5,732,800 A | * | 3/1998 | Spigener | B29C 43/006 188/234 |
| 5,816,901 A | * | 10/1998 | Sirany | B24B 5/065 451/415 |
| 6,032,767 A | * | 3/2000 | Roehling | F16D 65/092 188/250 B |
| 6,109,399 A | * | 8/2000 | Crawford | B62L 1/06 188/24.11 |
| 6,167,992 B1 | * | 1/2001 | Torpey | F16D 65/0006 188/250 G |
| 6,194,059 B1 | * | 2/2001 | Yesnik | F16D 69/026 428/218 |
| 6,213,260 B1 | * | 4/2001 | Sirany | B24B 7/17 188/250 B |
| 6,279,222 B1 | * | 8/2001 | Bunker | F16D 65/092 164/11 |
| 6,499,571 B1 | * | 12/2002 | Hays, Jr. | F16D 69/00 188/250 B |
| 6,851,527 B2 | * | 2/2005 | Hoffrichter | F16D 69/04 188/250 E |
| 6,890,467 B2 | * | 5/2005 | Wiaterek | F16D 65/092 264/247 |
| 6,932,199 B2 | * | 8/2005 | Emmett | F16D 65/0972 188/250 B |
| 7,111,709 B2 | * | 9/2006 | Baba | F16D 65/0006 188/250 E |
| 7,234,573 B2 | * | 6/2007 | Kurz | F16D 69/04 188/250 B |
| 7,424,936 B2 | * | 9/2008 | McClellan | F16D 66/028 188/1.11 R |
| D631,411 S | * | 1/2011 | Hiramori | D12/180 |
| 8,151,433 B2 | * | 4/2012 | Liu | B23P 15/18 188/250 B |
| 9,360,067 B1 | * | 6/2016 | Arbesman | F16D 65/092 |
| 2002/0130010 A1 | * | 9/2002 | Landa | F16D 69/02 192/107 M |
| 2003/0213658 A1 | * | 11/2003 | Baba | F16D 55/225 188/73.37 |
| 2005/0023091 A1 | * | 2/2005 | Ol | F16D 69/04 188/250 R |
| 2005/0161297 A1 | * | 7/2005 | Uwaydah | F16D 69/04 188/250 B |
| 2006/0049012 A1 | * | 3/2006 | Goldbach | F16D 65/092 188/250 G |
| 2006/0289250 A1 | * | 12/2006 | Dobrusky | F16D 65/0012 188/73.37 |
| 2008/0011562 A1 | * | 1/2008 | Hilbrandt | F16D 65/092 188/250 B |
| 2008/0035434 A1 | * | 2/2008 | Denys | F16D 65/092 188/73.37 |
| 2008/0116023 A1 | * | 5/2008 | Chen | B62L 1/005 188/251 A |
| 2008/0199641 A1 | * | 8/2008 | Hasegawa | F16D 13/64 428/34.1 |
| 2008/0251326 A1 | * | 10/2008 | Lundskog | F16D 65/092 188/1.11 W |
| 2009/0145703 A1 | * | 6/2009 | Elvenkemper | B29C 43/003 188/250 E |
| 2010/0012228 A1 | * | 1/2010 | Seguchi | B32B 15/011 148/225 |
| 2011/0198170 A1 | * | 8/2011 | Turani | C04B 35/571 188/250 B |
| 2011/0272222 A1 | * | 11/2011 | Heffelfinger | F16D 65/0037 188/1.11 W |
| 2012/0031718 A1 | * | 2/2012 | Arbesman | F16D 69/0408 188/251 R |
| 2013/0082420 A1 | * | 4/2013 | Kulis, Jr. | B29C 45/03 264/328.16 |
| 2013/0240306 A1 | | 9/2013 | Murphy et al. | |
| 2015/0159716 A1 | * | 6/2015 | Evans | F16D 65/84 188/71.6 |

* cited by examiner

BRAKE PAD

BACKGROUND

Field of the Invention

The present invention generally relates to a brake pad. More specifically, the present invention relates to a brake pad that includes two different materials layered such that one material provides braking friction and the other material provides braking friction and rotor cleaning/refurbishing properties when in contact with a brake rotor.

Background Information

A brake pad is designed to generate friction when in contact with a brake rotor (or brake drum). A braking surface of the brake pad is pressed against a corresponding braking surface of the brake rotor. Initially, the brake pad and the brake rotor are machined to include mating planar surfaces. Over time as the brake pad wears from repeated contact with the brake rotor, the brake surfaces of the brake pad and the brake rotor can experience uneven wear forming non-planar surface portions, such as concaved or convex annular ridges or annular rings.

SUMMARY

One object of the present disclosure is to provide a brake pad with a first material that produces friction when in contact with a brake rotor and a second material with abrasive properties that cleanse and/or refurbish braking surfaces of the brake rotor during braking operations.

In view of the state of the known technology, one aspect of the present disclosure is to provide a brake pad with backing plate and a brake lining. The backing plate has a brake lining attachment surface. The brake lining has a first side attached to the brake lining attachment surface and a second side that defines a friction surface. The brake lining has at least a first section and a second section. The first section includes a plurality of first layers and a plurality of second layers. Each of the plurality of first layers has a first material and each of the plurality of second layers has a second material. The plurality of first layers and the plurality of second layers are alternatingly arranged with each of the plurality of first layers being sandwiched between adjacent ones of the plurality of second layers. The first material is different from the second material. The second section includes a plurality of third layers and a plurality of fourth layers. Each of the plurality of third layers has the second material and each of the plurality of fourth layers has the first material. The plurality of third layers and the plurality of fourth layers are alternatingly arranged with each of the plurality of fourth layers being sandwiched between adjacent ones of the plurality of third layers. Ones of the plurality of first layers adjacent to corresponding ones of plurality of third layers are co-planar with one another and ones of the plurality of second layers adjacent to corresponding ones of plurality of fourth layers are co-planar with one another.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
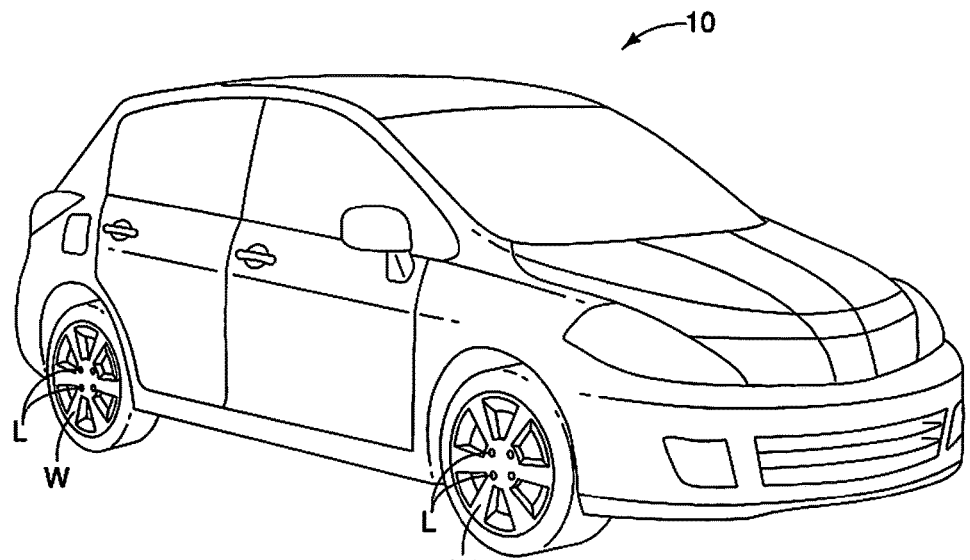
FIG. 1 is a perspective view of a vehicle with a plurality of wheels and a braking system with a braking assembly at each wheel in accordance with a first embodiment.
Figure 2:
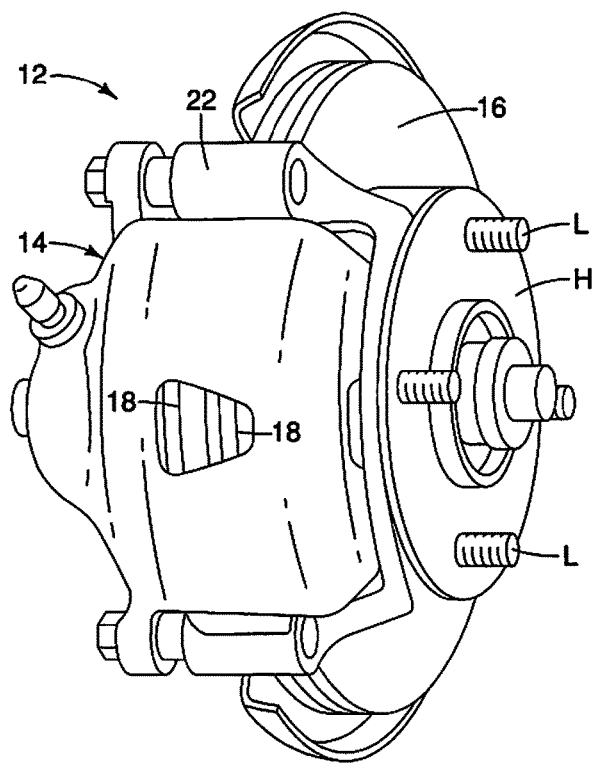
FIG. 2 is a perspective view of one of the braking assemblies of the vehicle depicted in FIG. 1, showing a brake caliper assembly, a brake rotor and brake pads in accordance with the first embodiment.

Referring initially to FIG. 1, a vehicle 10 having four wheels W attached to a hub H (FIG. 2) via studs L, is illustrated in accordance with a first embodiment. FIG. 2 shows one of a plurality of braking assemblies 12 of a braking system of the vehicle 10. Since each of the plurality of braking assemblies 12 is basically identical, only one of the braking assemblies 12 is described herein below. In other words, description of one of the braking assemblies 12 applies to all of the braking assemblies 12.

The braking assembly 12 includes a hydraulic caliper assembly 14, a brake rotor 16 and brake pads 18. Each respective brake rotor 16 is attached in a corresponding one of the hubs H in a conventional manner. Consequently, each of the wheels W attached to the studs L rotates with a corresponding one of the hubs H and corresponding one of the brake rotors 16. The brake pads 18 are described in greater detail below.

Figure 3:
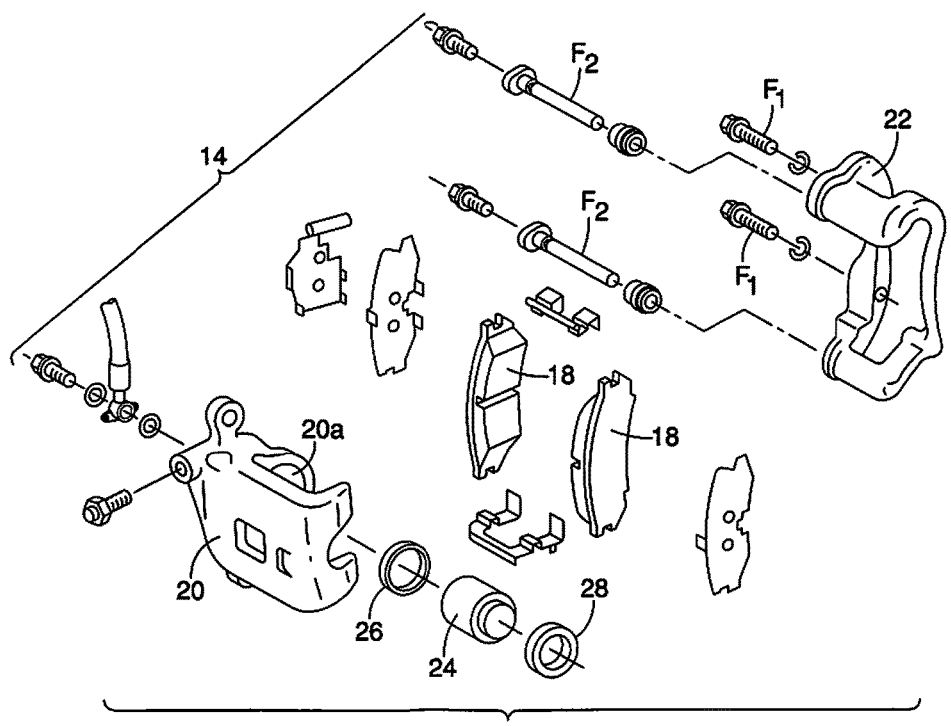
FIG. 3 is an exploded perspective view of the brake caliper assembly depicted in FIG. 2, showing the brake pads in accordance with the first embodiment.

As shown in FIG. 3, the hydraulic caliper assembly 14 of the braking assembly 12 includes a housing 20, a torque member 22, a hydraulic piston 24, a seal 26 and a boot 28. The housing 20 includes a bore 20a dimensioned to receive the hydraulic piston 24 and the seal 26 in a conventional manner. The seal 26 is fitted to the hydraulic piston 24 and the hydraulic piston 24 is moveably installed within the bore 20a in a conventional manner. The boot 28 is fitted to the hydraulic piston 24 and covers an exposed end of the bore 20a.

The brake rotor 16 is a conventional metallic vehicle component installed to the vehicle 10 in a conventional manner such that the brake rotor 16 rotates with a corresponding one of the wheels W of the vehicle 10. The brake rotor 16 includes braking surfaces 16a on opposite sides thereof. Since brake rotors, such as the brake rotor 16, are conventional vehicle members, further description is omitted for the sake of brevity.

Figure 4:
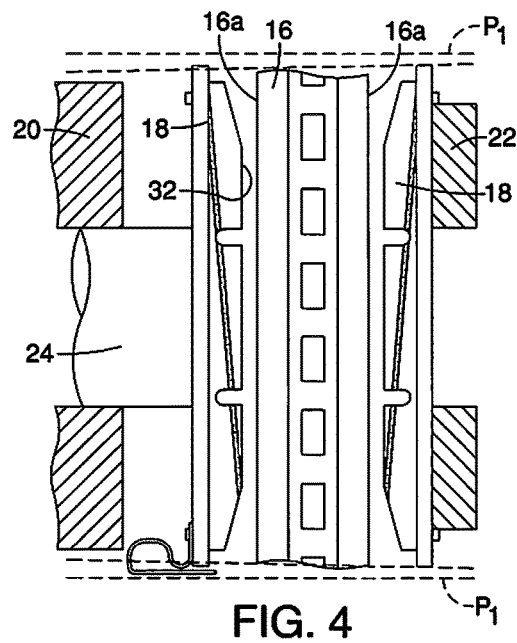
FIG. 4 is an end view of the brake caliper assembly showing the brake pads spaced apart from friction surfaces of the brake rotor in a brake dis-engaged orientation in accordance with the first embodiment.
Figure 5:
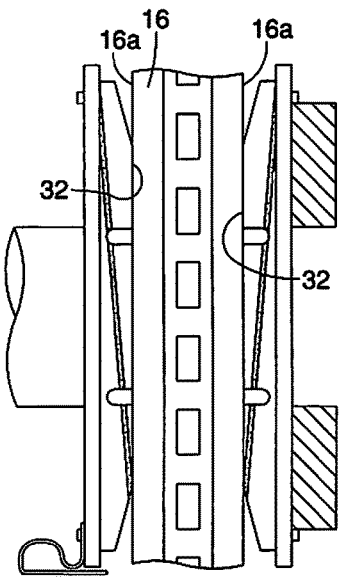
FIG. 5 is another end view of the brake caliper assembly similar to FIG. 4 showing the brake pads pressed against the friction surfaces of the brake rotor in a brake engaged orientation in accordance with the first embodiment.

The torque member 22 is non-movably installed to a portion (not shown) of the vehicle 10 in a conventional manner via fasteners $F_1$ adjacent to the brake rotor 16. The housing 20 and the brake pads 18 are installed to the torque member 22 via pins $F_2$. The housing 20 and the pads 18 can undergo a limited amount of movement along the length of the pins $F_2$. Specifically, as shown in FIGS. 4 and 5, the brake pads 18 are moved from a retracted position (FIG. 4) to a brake rotor contacting position (FIG. 5) in response to application of hydraulic pressure to the hydraulic piston 24. In response to release of the hydraulic pressure, the hydraulic piston 24 and the brake pads 18 from the brake rotor contacting position (FIG. 5) to the retracted position (FIG. 4).

As shown in FIG. 4 with the brake pads 18 in the retracted position, friction surfaces 32 of the brake pads 18 are spaced apart from the braking surfaces 16a of the brake rotor 16. Once hydraulic pressure behind the hydraulic piston 24 causes the hydraulic piston 24 to move the brake pads 18 to the brake rotor contacting position shown in FIG. 5, the friction surfaces 32 of each of the brake pads 18 is moved into contact with the adjacent braking surface 16a of the brake rotor 16. Since operation of the hydraulic caliper assembly 14 is conventional, further description is omitted for the sake of brevity.

Figure 6:
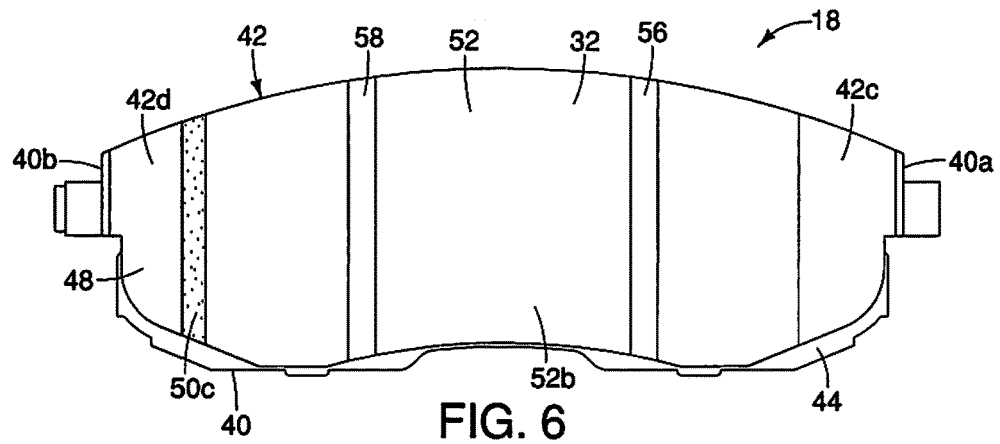
FIG. 6 is a plan view of the brake pad in a newly manufactured condition with no wear, showing a backing plate and a brake lining that defines a friction surface in accordance with the first embodiment.
Figure 7:
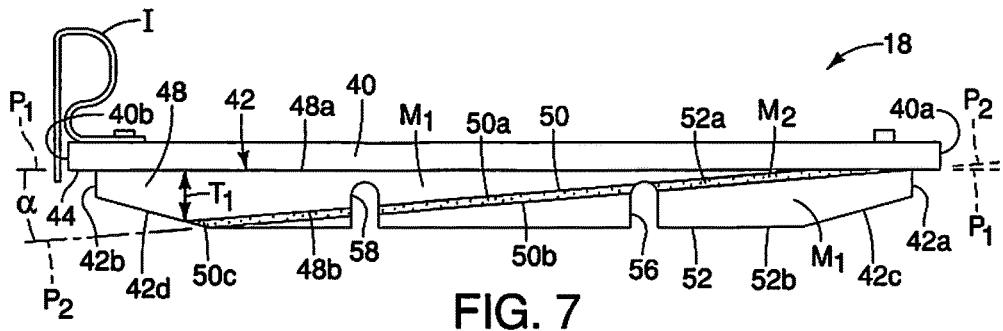
FIG. 7 is a side view of the brake pad in the newly manufactured condition showing the brake lining having a first layer fixed to a backing plate and having a first material, a second layer fixed to the first layer and having a second material, and a third layer fixed to the second layer and having the first material, the second layer being disposed between the first and third layers, the second layer extending in a direction that is angularly offset (non-parallel) from the backing plate such that an exposed portion of the second layer and the third layer initially define the friction surface of the brake pad in accordance with the first embodiment.

A description of a first embodiment of the brake pads 18 is now provided with respect to FIGS. 6 and 7. Since the pair of braking pads 18 shown in FIG. 3 are basically identical to one another, description of one applies equally to both. Therefore only one of the braking pads 18 is described herein below for the sake of brevity.

The brake pad 18 basically includes a backing plate 40 and a brake lining 42. The backing plate 40 has a brake lining attachment surface 44 that defines a first plane $P_1$ and a wear indicator I attached to a back surface of the baking plate 40. The brake lining 42 is fixed to the brake lining attachment surface 44 by, for example, any of a variety of compatible adhesive materials known in the art. In the first embodiment, the brake lining 42 includes a first layer 48, a second layer 50 and a third layer 52.

The first layer 48 includes a first material $M_1$, and has a first side 48a fixed to the brake lining attachment surface 44 of the backing plate 40 and a second side 48b opposite the first side 48a. The second side 48b defines a second plane $P_2$ that has a non-parallel relationship with the first plane $P_1$. More specifically, the second plane $P_2$ is angularly offset from the first plane $P_1$ by an angle α that is between 2 and 85 degrees. In the depicted first embodiment the angle α is approximately 5 degrees. However, the actual size of the angle α can vary from brake pad design to brake pad design. One consideration in the determination of the size of the angle α in the first embodiment is having one end of the second layer 50 extend to the backing plate 40 at a location that is adjacent a first end 40a the backing plate 40. The other end of the second layer 50 extends toward a second end 40b of the backing plate 40, but is exposed along the friction surface 32, as shown in FIGS. 6 and 7. However, this consideration need not apply to every embodiment. The angle α can be determined based on other considerations, as is demonstrated in several of the embodiments described further herein below, after description of the first embodiment.

The second layer 50 includes a second material $M_2$, a first side 50a and a second side 50b. The first side 50a of the second layer 50 extends along and is fixed to the second side 48b of the first layer 48 and coincides with the second plane $P_2$. As shown in FIGS. 6 and 7, an exposed portion 50c of the second layer 50 defines a portion of the friction surface 32. The first side 50a of the second layer 50 is generally planar and the second side 50b of the second layer 50b is generally planar. Further, in the depicted embodiment, the first side 50a is parallel to the second side 50b. The thickness of the second layer 50 varies from brake pad design to brake pad design. In the first embodiment, the thickness of the second layer 50 can be anywhere from 5% to 25% of the overall thickness of the brake lining 42. However, the thickness of the second layer 50 and the overall thickness of the brake lining 42 is also determined based upon the weight and design of the vehicle 10 and the overall braking force required to slow the vehicle 10 or bring the vehicle 10 to a stop.

The third layer 52 includes the first material $M_1$, a first side 52a and a second side 52b. Alternatively, the third layer 52 can include a third material $M_3$. The third material $M_3$ can be similar to $M_1$, similar to $M_2$ or any other composition. The first side 52a overlays and is attached to the second side 50b of the second layer 50. The second side 52b of the third layer 52 together with the exposed portion 50c of the second layer 50 defines the friction surface 32 of the brake lining 42.

As shown in the first embodiment, the brake lining 42 can be formed with angled ends 42c and 42d that are inclined relative to the friction surface 32. After being fully shaped during the manufacture of the brake pad 18, the friction surface 32 is parallel to the first plane $P_1$, while the angled ends 42c and 42d are not parallel to the first plane $P_1$, but rather are inclined relative to friction surface 32. Once fully assembled and shaped, the first plane $P_1$ and the second plane $P_2$ intersect one another along the second lateral edge of the brake lining, as indicated in FIG. 7.

As shown in FIG. 7, the first layer 48 has an overall wedge shape as viewed along a longitudinal side of the brake lining 42. The brake lining 42 has an overall thickness $T_1$. The first layer 48 also has a thickness equivalent to the thickness $T_1$ at a second lateral edge 42b of the brake lining 42 measured from the first side 48a to the second side 48a of the first layer 48. The thickness $T_1$ is several times the thickness of the second layer 50. The first layer 48 tapers in thickness toward a first lateral edge 42*a* of the brake lining 42 such that the first layer 48 has no measurable thickness at the first lateral edge 42*a* of the brake lining 42.

Similarly as shown in FIG. 7, the third layer 52 has a wedge shape as viewed along the longitudinal side of the brake lining 42. The third layer 52 tapers in thickness toward a second lateral edge 42*b* of the brake lining 42 such that the third layer 52 has no measurable thickness at the second lateral edge 42*b* of the brake lining 42. When the brake pad 18 is assembled and unused, the brake lining 42 has the first thickness $T_1$. However, as the brake pad 18 is used for braking operations and undergoes wear, the thickness of the brake lining 42 is reduced, increasingly less than the first thickness $T_1$ as wear progresses, as shown in FIGS. 8 through 11.

The second layer 50 has a generally constant thickness measured from the first side 50*a* to the second side 50*b* thereof, but is angularly offset from the friction surface 32.

As shown in FIGS. 6 and 7, the brake lining 42 includes two slots 56 and 58. The slots 56 and 58 are formed in the brake lining 42 such that they extend from the friction surface 32 toward the backing plate 40. Each of the slots 56 and 58 are formed such that a portion of the second layer 50 is exposed within each of the slots 56 and 58.

Figure 8:
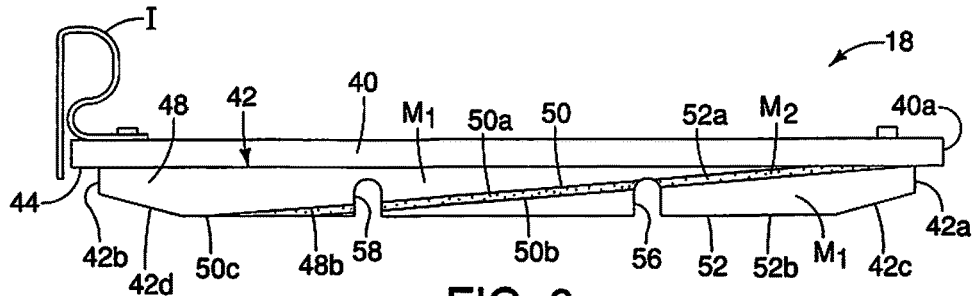
FIG. 8 is a side view of the brake pad similar to FIG. 7, showing the brake pad with an intermediate amount of wear such that the overall thickness of the brake pad is reduced, such that a portion of the first layer, an exposed portion of the second layer and the third layer define the friction surface in accordance with the first embodiment.
Figure 9:
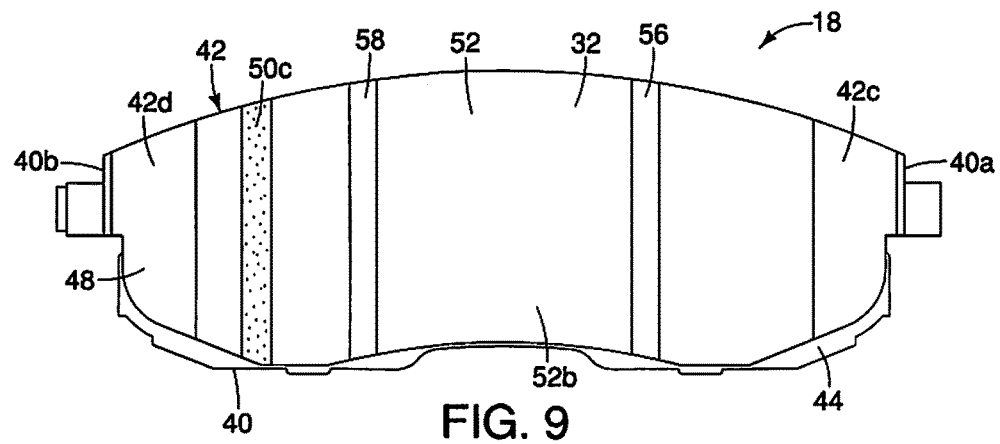
FIG. 9 is a front view of the brake pad similar to FIG. 6, showing the brake pad with the intermediate amount of wear shown in FIG. 8 with the portion of the first layer, the exposed portion of the second layer and the third layer defining the friction surface in accordance with the first embodiment.

FIGS. 8 and 9 show the brake pad 18 after undergoing an initial amount of wear. The third layer 52 initially defines most of the friction surface 32 and therefore, most of the wear experienced by the brake lining 42 of the brake pad 18 is observed in the third layer 62. As wear of the brake lining 42 progresses, the third layer 52 defines less of the overall surface area of the friction surface 32. At the same time, more of the first layer 48 begins to be exposed and begins to define the friction surface 32. Meanwhile during the wearing process, the location of the exposed portion 50*c* of the second layer 50 moves away from the second lateral edge 42*b* of the brake lining 42 and is closer to the slot 58, as compared to the unworn brake pad 18 shown in FIGS. 6 and 7. Since the second layer 50 is inclined by the angle α relative to the friction surface 32, the exposed portion 50*c* of the second layer 50 is now at a location further spaced apart from the second lateral edge 42*d*. Further, the size of each of the angled section 42*c* and angled section 42*d* is reduced.

Figure 10:
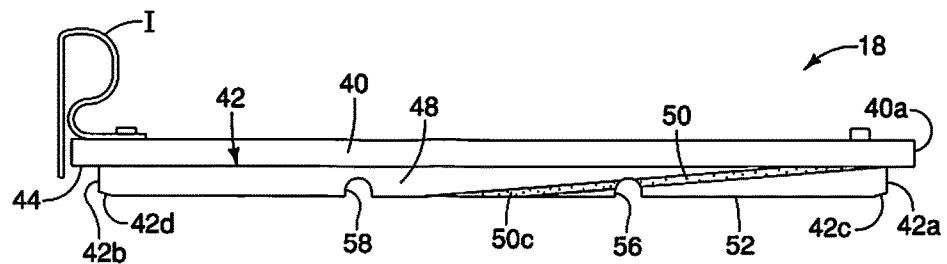
FIG. 10 is a side view of the brake pad similar to FIG. 8, showing the brake pad with an advanced amount of wear such that the overall thickness of the brake pad is further reduced as compared to FIG. 8, such that a further portion of the first layer, a further exposed portion of the second layer and the third layer define the friction surface in accordance with the first embodiment.
Figure 11:
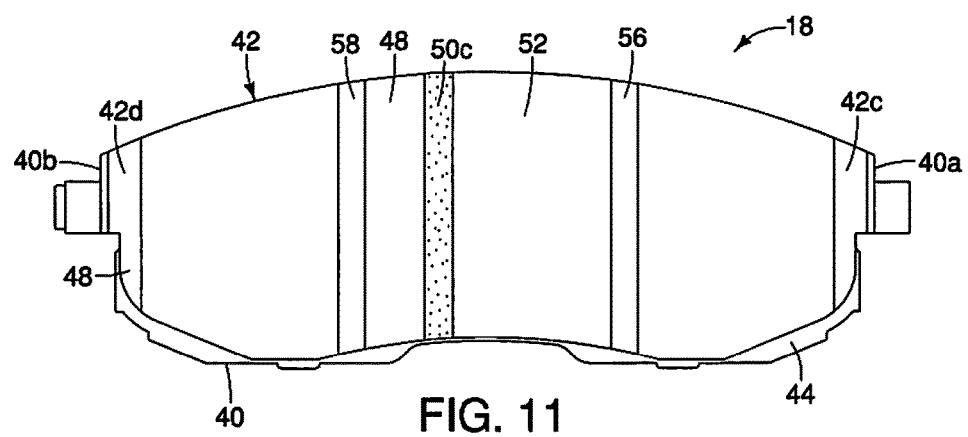
FIG. 11 is another front view of the brake pad similar to FIG. 9, showing the brake pad with advanced amount of wear shown in FIG. 10 with the further portion of the first layer, the further exposed portion of the second layer and the third layer defining the friction surface in accordance with the first embodiment.

FIGS. 10 and 11 show the brake pad 18 after undergoing a further amount of wear. As mentioned above, the third layer 52 initially defined most of the friction surface 32 and therefore, as a result of the further wear experienced by the brake lining 42, the exposed surface area of the third layer 62 is reduced by between 30 and 45 percent in FIGS. 10 and 11, as compared to FIGS. 6 and 7. In FIGS. 10 and 11, much more of the first layer 48 is exposed and defines a larger section of the friction surface 32. Further, the second layer 50 has worn to the extent that there is no sign of the second layer 50 between the slot 58 and the second lateral edge 42*b* of the brake lining 42. Rather, the exposed portion 50*c* of the second layer 50 is now located between the slots 56 and 58.

A description is now provided of the first material $M_1$ and the second material $M_2$ of the brake lining 42 of the brake pad 18.

The first material $M_1$ and the second material $M_2$ are made of different components and therefore have differing properties. Specifically, the first material $M_1$ is preferably a material categorized as a non-asbestos organic material. For example, the first material $M_1$ can include a mixture of fiber materials and binding materials. The fiber materials of the first material $M_1$ can include at least one material selected from a group of materials consisting of glass, rubber, carbon and Kevlar. The binding materials are any of a variety of convention binding materials such as, resins or other adhesive materials capable of withstanding high temperature conditions. The first material $M_1$ is formulated, manufactured and arranged to be a friction generating material that produces desired amounts of friction when urged into contact with the friction surfaces 16*a* of the brake rotor 16. More specifically, when used alone as the sole material for use in the brake lining 42 of the brake pad 18, the first material $M_1$ provides sufficient friction generation for use in braking systems of passenger vehicles and commercial vehicles.

The second material $M_2$ is basically formulated as an abrasive material that also produces friction when in contact with the friction surfaces 16*a* of the brake rotor 16. However, the inclusion of the second material $M_2$ in the brake pad 18 is for the purpose of providing a cleaning effect and rotor surface re-conditioning effect or refurbishing effect when in contact the friction surfaces 16*a* of the brake rotor 16. For example, as the brake pad 18 and the friction surfaces 16*a* of the brake rotor 16 experience wear, occasionally an annular ridge or ring can develop on one of the friction surface 32 and the friction surface 16*a*, and a corresponding annular concave depression can develop on the other of the friction surface 32 and the friction surface 16*a*. The inclusion of the second material $M_2$ in the brake pad 18 provides an abrasive effect to the brake pad 18 that reduces and/or eliminates such annular ridges, rings depressions and any material that might cause such formations on the friction surface 32 and the friction surface 16*a*.

The second material $M_2$ has a metal content that includes, for example, a metal, friction modifiers, graphite lubricant and filler material. The metal is at least one selected from a group consisting of steel, iron and copper.

Hence, in the brake pad 18, the first material $M_1$ primarily provides braking friction in response to contact with the braking rotor 16, and the second material $M_2$ provides abrasiveness in response to contact with the braking rotor 16 as well as friction.

The brake pad 18 can be manufactured using any of a plurality of methods. One such method of manufacturing the brake pad 18 is now provided with specific reference to FIGS. 12 through 17.

Figure 12:
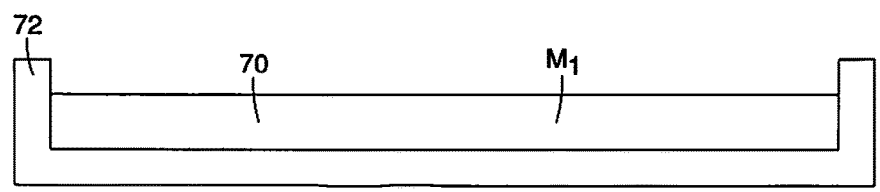
FIG. 12 is a side view of a mold having the first material therein forming a puck used to manufacture the brake lining of the brake pad in accordance with the first embodiment.

As shown in FIG. 12, initially a puck 70 of non-asbestos organic material is formed of the first material $M_1$. More specifically, a binder material or binder materials are mixed with non-asbestos fiber materials such as one or more of glass, rubber, carbon and Kevlar and thereafter put into a mold 72, and allowed to solidify or at least partially cure.

Figure 13:
FIG. 13 is a side view of the puck removed from the mold depicted in FIG. 12, in accordance with the first embodiment.
Figure 14:
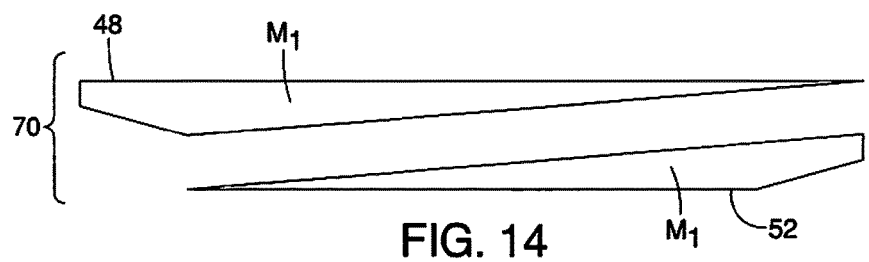
FIG. 14 is another side view of the puck after cutting the puck along a diagonal plane to form the first layer and the third layer of the brake lining in accordance with the first embodiment.

As shown in FIG. 13, the puck 70 is removed from the mold 72 and can optionally be shaped to include the angled sections 42*c* and 42*d*. However, it should be understood from the drawings and the description herein that the angled sections 42*c* and 42*d* can be formed later in the manufacturing process. As shown in FIG. 14, the puck 70 is cut into two wedge shaped sections that eventually define the first layer 48 and the third layer 52.

Figure 15:
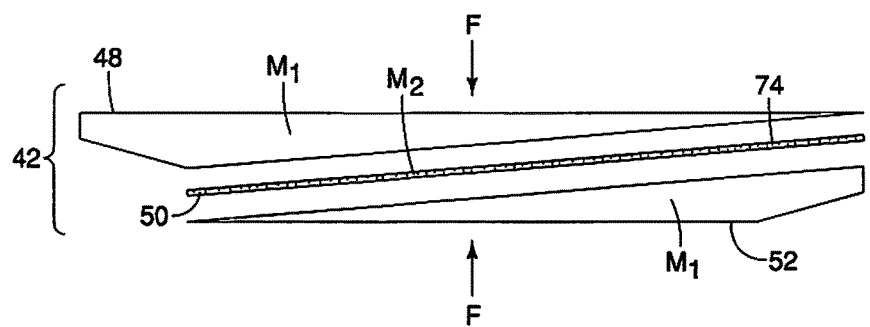
FIG. 15 is a side view of the first layer and the second layer depicted in FIG. 14, with a thick sheet made of the second material inserted between the first and second layers, the thick sheet subsequently defining the second layer of the brake lining such that after application of force pressing the first layer, the second layer and the third layer together, and thereafter baking and curing, the brake lining is formed, in accordance with the first embodiment.

In a separate process, the second material $M_2$ is formulated and formed with a predetermined thickness into a flat elongated member that is thereafter cut into predetermined lengths to define sections 74. As shown in FIG. 15, one of the sections 74 is inserted between the first layer 48 and the third layer 52 and sandwiched therebetween thereby defining the second layer 50. The first layer 48, second layer 50 and third layer 52 are then pressed together by a predetermined force F to form the brake lining 42. The assembled brake lining 42 is then heated (baked) and cured.

Figure 16:
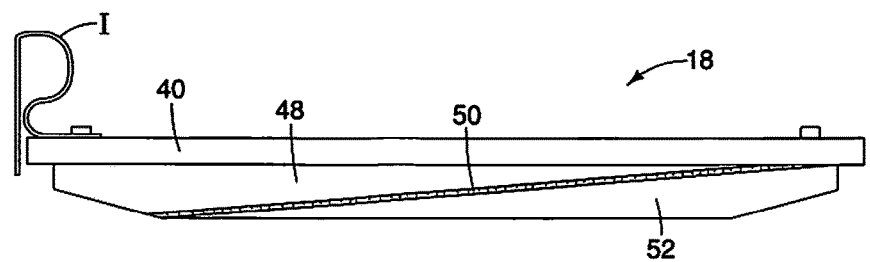
FIG. 16 is a side view of the brake lining attached to the backing plate to form the brake pad in accordance with the first embodiment.

Next, as shown in FIG. 16, the backing plate 40 and the brake lining 42 are adhered to one another, thereby forming the brake pad 18.

Figure 17:
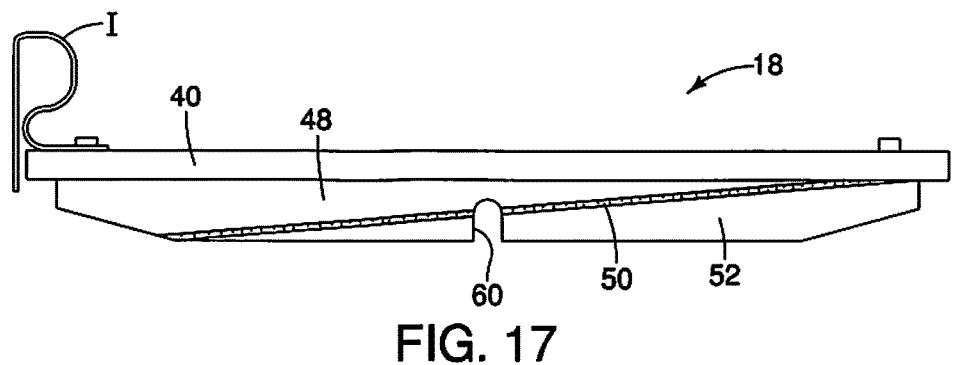
FIG. 17 is another side view of the brake pad showing a slot being formed in the brake lining in accordance with the first embodiment.

As shown in FIG. 17, a slot 60 can be formed in the brake lining 42, or as shown in FIG. 7, the slots 56 and 58 can be formed in the brake lining 42. Alternatively, the brake lining 42 of the brake pad 18 can be formed in the absence of any slots, as shown in FIG. 16.

Figure 18:
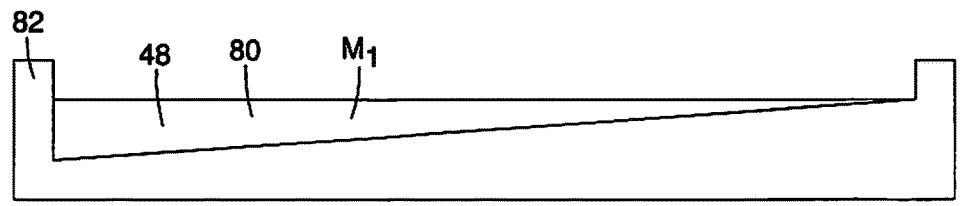
FIG. 18 is a side view of an alternative mold having the first material therein forming an alternatively shaped puck used to manufacture the brake lining of the brake pad in accordance with a modification to the first embodiment.
Figure 19:
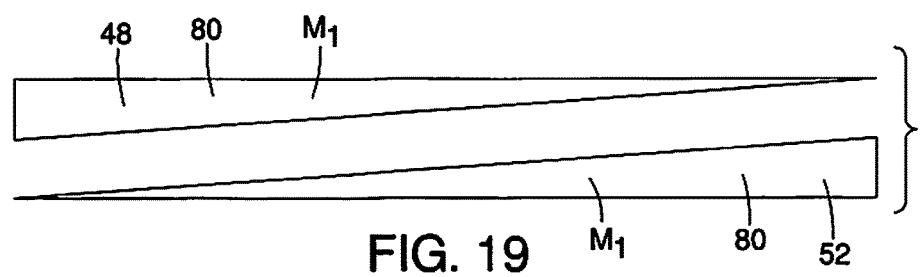
FIG. 19 is a side view a plurality of the pucks made using the alternative mold depicted in FIG. 18 shown removed from the alternative mold, the plurality of puck oriented to define the first layer and the third layer of the brake lining in accordance with the modification to the first embodiment.

Alternatively, the brake pad 18 can be manufactured in a manner represented in FIGS. 18 through 23. As shown in FIG. 18, initially a puck 80 of non-asbestos organic material is formed of the first material $M_1$. More specifically, a binder material or binder materials are mixed with non-asbestos fiber materials such as one or more of glass, rubber, carbon and Kevlar and thereafter put into a mold 82, and allowed to solidify or at least partially cure. The puck 80 has a wedge shape or a triangular shape as viewed from the side in FIG. 18. A plurality of the pucks 80 are formed and are subsequently used to define the first layer 48 and the third layer 52, as shown in FIG. 19.

Figure 20:
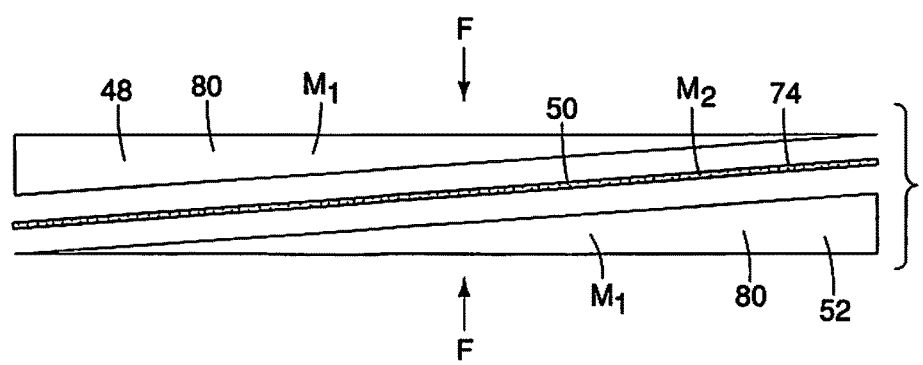
FIG. 20 is a side view of the first layer and the second layer depicted in FIG. 19, with the thick sheet made of the second material inserted between the first and second layers, the thick sheet subsequently defining the second layer of the brake lining such that after application of force pressing the first layer, the second layer and the third layer together, and thereafter baking and curing, the brake lining is formed, in accordance with the modification to the first embodiment.
Figure 21:
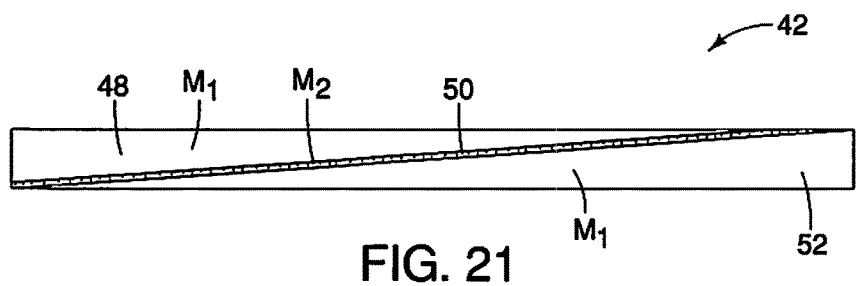
FIG. 21 is a side view of the brake lining with the first, second and third layers after manufacturing in accordance with the modification to the first embodiment.

As shown in FIG. 20, one of the sections 74 is inserted between the first layer 48 and the third layer 52 and sandwiched therebetween thereby defining the second layer 50. The first layer 48, second layer 50 and third layer 52 are then pressed together by a predetermined force F to form the brake lining 42. The assembled brake lining 42 shown in FIG. 21 is then heated (baked) and cured.

Figure 22:
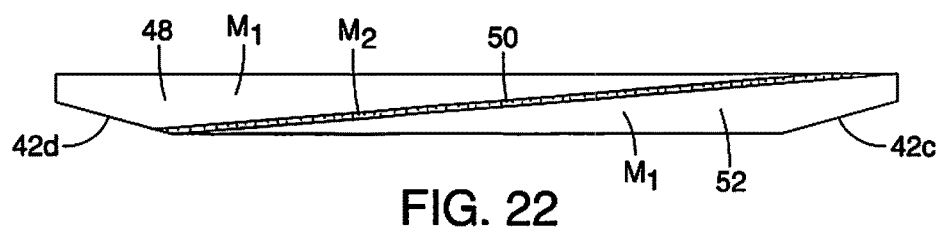
FIG. 22 is another side view of the brake lining with the first, second and third layers after shaping in accordance with the modification to the first embodiment.

Next, as shown in FIG. 22, the angled sections 42c and 42d can optionally be formed on the brake lining 42. Alternatively, the angled sections 42c and 42d can be formed on the brake lining 42 after the backing plate 40 and the brake lining 42 are fixed to one another.

Figure 23:
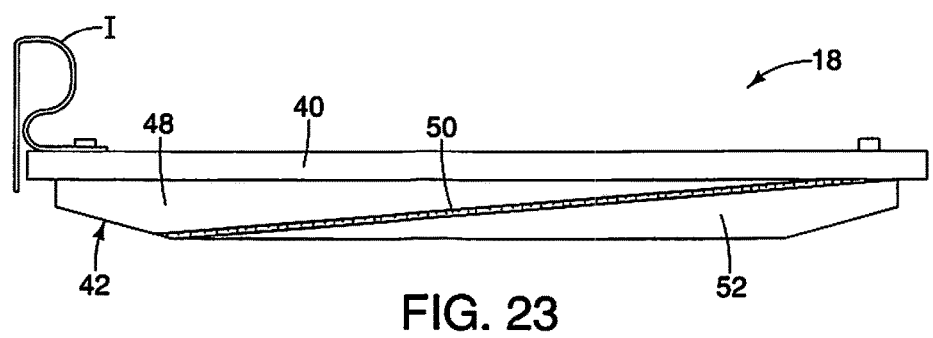
FIG. 23 is a side view of the brake lining attached to the backing plate to form the brake pad in accordance with the modification to the first embodiment.

As shown in FIG. 23, the backing plate 40 and the brake lining 42 are adhered to one another using an appropriate adhesive material, thereby forming the brake pad 18. It should be understood from the drawings and the description herein, that the final overall shape of the brake lining 42, including the formation of the slots 56 and 58, can be performed after the backing plate 40 and the brake lining 42 are fixed to one another.

For example, as shown in FIG. 17, a slot 60 can be formed in the brake lining 42, or as shown in FIG. 7, the slots 56 and 58 can be formed in the brake lining 42. Alternatively, the brake lining 42 of the brake pad 18 can be formed in the absence of any slots, as shown in FIGS. 16 and 23.

Second Embodiment

Figure 24:
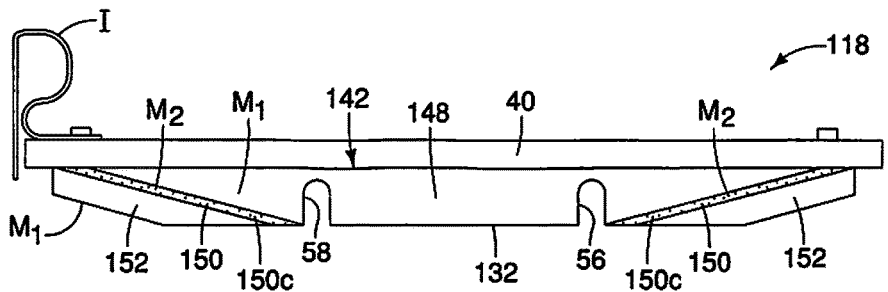
FIG. 24 is a side view of a brake pad having the backing plate and a brake lining in accordance with a second embodiment.
Figure 25:
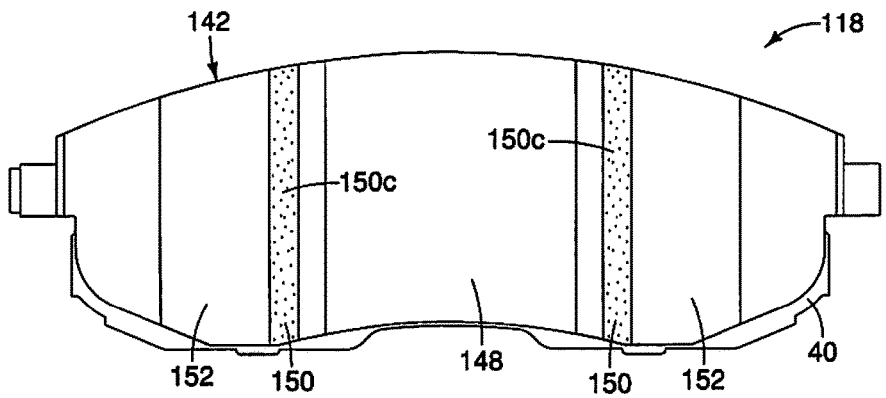
FIG. 25 is a front view of the brake pad in accordance with the second embodiment.

Referring now to FIGS. 24-25, a brake pad 118 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The brake pad 118 includes the backing plate 40 as described above with respect to the first embodiment and a brake lining 142. The brake lining 142 includes a first layer 148 made with the first material $M_1$ (as described above with respect to the first embodiment), a pair of second layers 150, each made with the second material $M_2$ (as described above with respect to the first embodiment) and a pair of third layers 152 made of the first material $M_1$.

The first layer 142 has a trapezoidal shape as viewed in FIG. 24, with opposite inclined surfaces thereof being covered by respective ones of the second layers 150. The second layers 150 are spaced apart from one another with a main portion of the first layer 148 being exposed and defining a portion of a friction surface 132 of the brake pad 118. The second layers 150 are at least partially covered by respective ones of the third layers 152. Exposed portions 150c of the second layers 150 are exposed between the first layer 148 and respective ones of the third layers 152. In an unworn state as shown in FIGS. 24 and 25, the exposed portions 150c of the second layers 150 are adjacent to respective ones of the slots 56 and 58.

The second layers 150 have respective first ends that extend to and contact the brake lining attachment surface 44 of the baking plate 40 adjacent to opposing ends of the baking plate 40.

Third Embodiment

Figure 26:
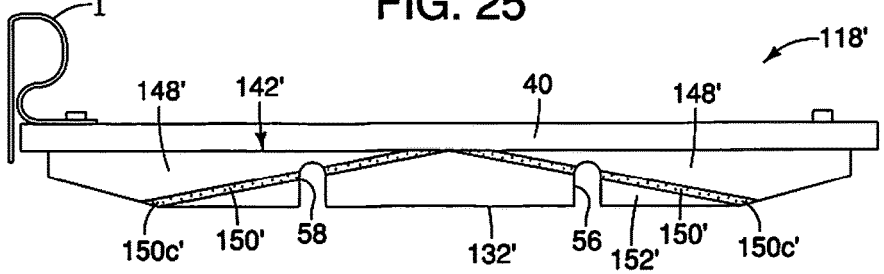
FIG. 26 is a side view of a brake pad having the backing plate and a brake lining in accordance with a third embodiment.
Figure 27:
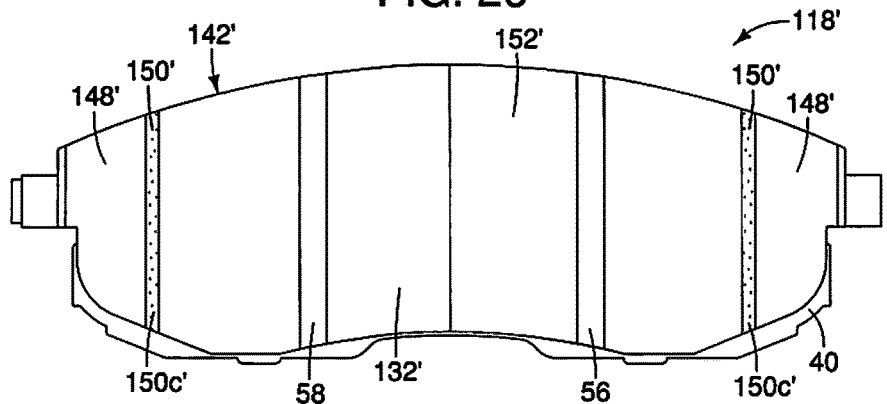
FIG. 27 is a front view of the brake pad in accordance with the third embodiment.

Referring now to FIGS. 26-27, a brake pad 118' in accordance with a third embodiment will now be explained. In view of the similarity between the second and third embodiments, the parts of the third embodiment that are identical to the parts of the first embodiment and/or the second embodiment will be given the same reference numerals as the parts of the first embodiment or the second embodiment. Moreover, the descriptions of the parts of the third embodiment that are identical to the parts of the first embodiment may be omitted for the sake of brevity. The parts of the first embodiment that differ from the parts of the first embodiment and/or the second embodiment will be indicated with a single prime (').

The brake pad 118' includes the backing plate 40 as described above with respect to the first embodiment and a brake lining 142'. The brake lining 142' includes a pair of first layers 148' made with the first material $M_1$ (as described above with respect to the first embodiment), a pair of second layers 150', each made with the second material $M_2$ (as described above with respect to the first embodiment) and a third layer 152' made of the first material $M_1$.

The first layers 142' define a V-shape as viewed in FIG. 26, with inclined surfaces thereof facing one another defining the V-shape. The surfaces of the first layers 142' are covered by respective ones of the second layers 150'. The second layers 150' can be arranged to contact one another at the apex of the V-shape. Portions of the first layers 148' on either side of the second layers 150' are exposed and once the brake pad 118' undergoes wear, the first layers 148' eventually define a portion of a friction surface 132' of the brake pad 118'. However, initially, only the third layer 152' and exposed portions 150c' of the second layers 150' define the friction surface 132'.

The second layers 150' are at least partially covered by respective the third layer 152'. Exposed portions 150c' of the second layers 150' are exposed between respective portions of the first layer 148' and the third layer 152'.

The second layers 150 have respective first ends that extend to and contact the brake lining attachment surface 44 of the baking plate 40 adjacent to a central portion of the baking plate 40.

Fourth Embodiment

Figure 28:
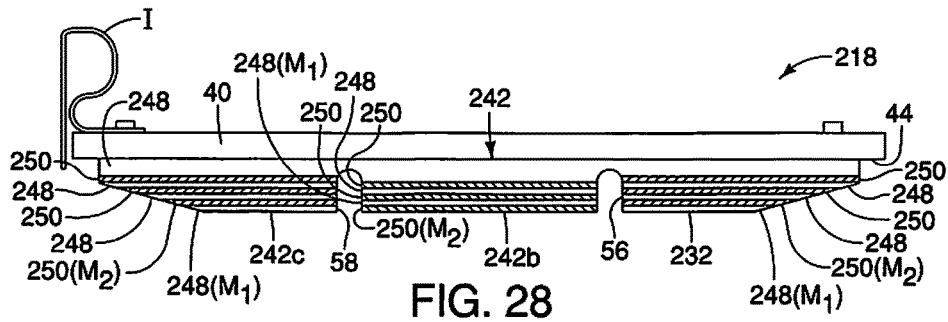
FIG. 28 is a side view of a brake pad having the backing plate and a brake lining in accordance with a fourth embodiment.
Figure 29:
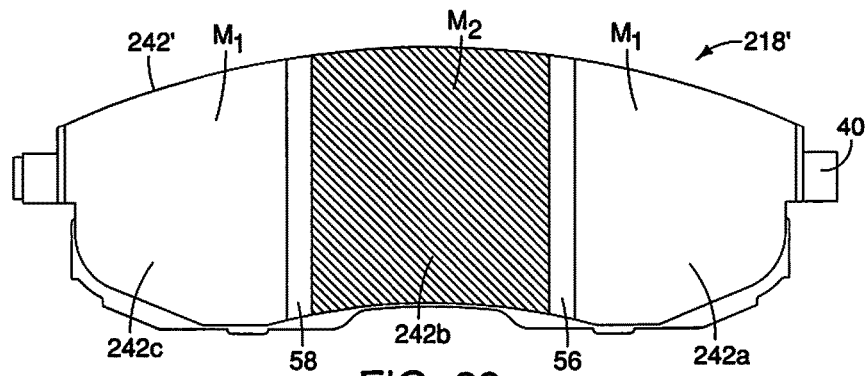
FIG. 29 is a front view of the brake pad in accordance with the fourth embodiment.

Referring now to FIG. 28-29, a brake pad 218 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the brake pad 218 includes the backing plate 40 as described above in the first embodiment, and a brake lining 242. The backing plate 40 has the brake lining attachment surface 44, as described above in the first embodiment, defining the first plane $P_1$.

The brake lining 242 is attached to the brake lining attachment surface 44 and has a friction surface 232. As shown in FIGS. 28 and 29, the brake lining 242 includes a first section 242a, a second section 242b and a third section 242c. In the fourth embodiment, the slot 56 separates the first section 242a from the second section 242b, and the slot 58 separates the second section 242b from the third section 242c.

The first section 242a includes a plurality of first layers 248 and a plurality of second layers 250 alternatingly arranged with each of the plurality of first layers 248 being sandwiched between adjacent ones of the plurality of second layers 250. Each of the plurality of first layers 248 are manufactured using the first material $M_1$. Each of the plurality of second layers 250 are manufactured using the second material $M_2$. As shown in FIGS. 28 and 29, when newly manufactured (without wear) one of the first layers 248 is exposed, at least partially defining a friction surface 232 of the brake lining 242.

The first material $M_1$ and the second material $M_2$ are different from one another, as described above with respect to the first embodiment. In other words, the first material $M_1$ and the second material $M_2$ are as described above, with the first material $M_1$ producing friction when in contact with one of the braking surfaces 16a of the brake rotor 16, and the second material $M_2$ providing abrasiveness in addition to producing friction when in contact with the brake rotor 16.

The second section 242b of the brake lining 242 includes a plurality of second layers 250 (also referred to as third layers) and a plurality of first layers 248 (also referred to as fourth layers) alternatingly arranged with each of the plurality of second layers 250 being sandwiched between adjacent ones of the plurality of first layers 248. As shown in FIGS. 28 and 29, when newly manufactured (without wear) one of the second layers 250 is exposed, at least partially defining a friction surface 232 of the brake lining 242.

The third section 242c, like the first section 242a, includes a plurality of first layers 248 (also referred to as fifth layers) and a plurality of second layers 250 (also referred to as sixth layers) alternatingly arranged with each of the plurality of first layers 248 being sandwiched between adjacent ones of the plurality of second layers 250. As shown in FIGS. 28 and 29, when newly manufactured (without wear) one of the first layers 248 of the third section 242c is exposed, at least partially defining a friction surface 232 of the brake lining 242. Consequently, when newly manufactured, the first and third sections 242a and 242c of the brake lining 242 each have one of the first layers 248 being exposed, while the second section 242b has one of the second layers 250 being exposed.

In each of the three sections 242a, 242b and 242c of the brake lining 242, the following relationships are established. Specifically, ones of the plurality of first layers 248 of the first section 242a and 242c adjacent to corresponding ones of plurality of second layers 250 (third layers) of the second section 242b are co-planar with one another. Similarly, ones of the plurality of second layers 250 of the first section 242a and the third section 242c of the brake lining 242 adjacent to corresponding ones of plurality of first layers 248 (fourth layers) of the second section 242b of the brake lining 242 are co-planar with one another. Further, each of the plurality of first layers 248 (regardless of which section of the brake lining 242 they are in) have the same thickness as each of the plurality of second layers 250 (regardless of which section of the brake lining 242 they are in). Further, as shown in FIG. 28, each of the plurality of first layers 248 and each of the plurality of second layers 250 have planar surfaces in contact with adjacent ones of the plurality of first layers 248 and the plurality of second layers 250.

It should be understood from the drawings and the description herein, that as the brake lining 242 experiences wear, the friction surface 232 will sequentially change. Specifically, as ones of the first layers 248 wear away, the underlying one of the second layers 250 will become exposed and will then begin to partially define the friction surface 232, and as ones of the second layers 250 wear away, the underlying one of the first layers 248 will become exposed and will then at least partially define the friction surface 232. However, due to the arrangement of the first, second and third sections 242a, 242b and 242c, the friction surface 232 will always have at least one section thereof defined by the first material $M_1$ and will always have at least one section thereof defined by the second material $M_2$. Thus, the brake pad 218 will have both a friction material (the first material $M_1$) and an abrasive material (the second material $M_2$) contacting the brake rotor 16 during braking operations.

Fifth Embodiment

Figure 30:
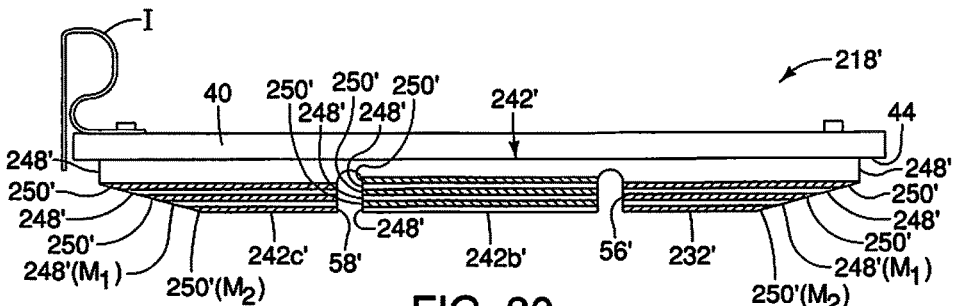
FIG. 30 is a side view of a brake pad having the backing plate and a brake lining in accordance with a fifth embodiment.

Referring now to FIG. 30, a brake pad 218' in accordance with a fifth embodiment will now be explained. In view of the similarity between the first, fourth and fifth embodiments, the parts of the fifth embodiment that are identical to the parts of the first and fourth embodiments will be given the same reference numerals as the parts of the first and fourth embodiments. Moreover, the descriptions of the parts of the fifth embodiment that are identical to the parts of the first and forth embodiments may be omitted for the sake of brevity. The parts of the fifth embodiment that differ from the parts of the first and fourth embodiments will be indicated with a single prime (')

In the fifth embodiment, the brake pad 218' includes a brake lining 242' that is very similar to the brake lining 242 of the fourth embodiment. Specifically, in the fifth embodiment, the brake lining 242' includes a first section 242a', a second section 242b', and a third section 242c'. Each of the first, second and third sections 242a', 242b' and 242c' are formed of alternating first layers 248' and second layers 250'. As in the first and fourth embodiments, the first layers 248' include the first material $M_1$ and the second layers 250' include the second material $M_2$. However, a friction surface 232' of the brake lining 242' has a different combination of exposed layers that define the friction surface 232'. Specifically, with the brake pad 218' in the unworn new condition as shown in FIG. 30, one of the second layers 250' is exposed on the first section 242a', one of the first layers 248' is exposed on the second section 242b', and another one of the second layers 250' is exposed on the third section 242c' of the brake lining 242'. Hence, the friction surface 232' of the brake pad 218' is defined by two of the second layers 250' and one of the first layer 248', with the first layer 248' a being located between the two of the second layers 250'.

The braking and abrasive effects of the brake pad 218' are essentially the same as the brake pad 218 of the fourth embodiment. Specifically, as the brake lining 242' experiences wear, the friction surface 232' will sequentially change. Specifically, as ones of the first layers 248' wear away, the underlying one of the second layers 250' will become exposed and will then begin to partially define the friction surface 232', and as ones of the second layers 250' wear away, the underlying one of the first layers 248' will become exposed and will then at least partially define the friction surface 232'. However, due to the arrangement of the first, second and third sections 242a', 242b' and 242c', the friction surface 232' will always have at least one section thereof defined by the first material $M_1$ and will always have at least one section thereof defined by the second material $M_2$. Thus, the brake pad 218' will have both a friction material (the first material $M_1$) and an abrasive material (the second material $M_2$) contacting the brake rotor 16 during braking operations.

Sixth Embodiment

Figure 31:
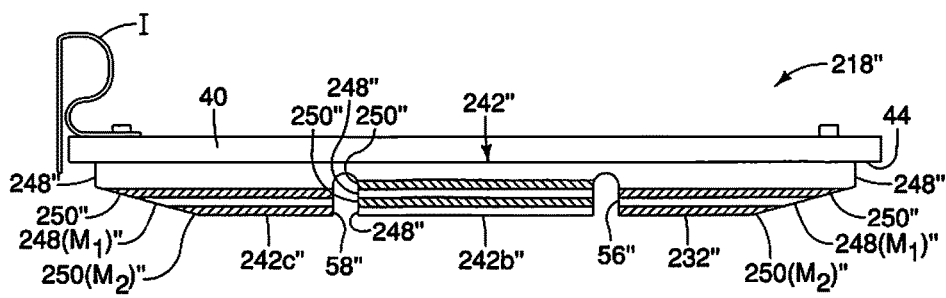
FIG. 31 is a side view of a brake pad having the backing plate and a brake lining in accordance with a sixth embodiment.

Referring now to FIG. 31, a brake pad 218" in accordance with a sixth embodiment will now be explained. In view of the similarity between the first, fourth, fifth and sixth embodiments, the parts of the sixth embodiment that are identical to the parts of the first, fourth and fifth embodiments will be given the same reference numerals as the parts of the first, fourth and fifth embodiments. Moreover, the descriptions of the parts of the sixth embodiment that are identical to the parts of the first, fourth and fifth embodiments may be omitted for the sake of brevity. The parts of the sixth embodiment that differ from the parts of the first, fourth and fifth embodiments will be indicated with a double prime (")

In the sixth embodiment, the brake pad 218" includes a brake lining 242" that is very similar to the brake lining 242 of the fourth embodiment and brake lining 242' the fifth embodiment. Specifically, in the sixth embodiment, the brake lining 242" includes a first section 242a", a second section 242b", and a third section 242c". Each of the first, second and third sections 242a", 242b" and 242c" are formed of alternating first layers 248" and second layers 250". As in the first, fourth and fifth embodiments, the first layers 248" include the first material $M_1$ and the second layers 250" include the second material $M_2$. The friction surface 232" of the brake lining 242" is such that one of the second layers 250" is exposed on the first section 242a", one of the first layers 248" is exposed on the second section 242b", and another one of the second layers 250" is exposed on the third section 242c" of the brake lining 242". However, in each of the first section 242a", the second section 242b" and the third section 242c", there are fewer alternating layers of the first layers 248" and the second layers 250".

It should be understood from the sixth embodiment, that the brake pad 218, 218' and/or 218" may be provided with any appropriate number of alternating ones of the first layers 248" and the second layers 250".

Seventh Embodiment

Figure 32:
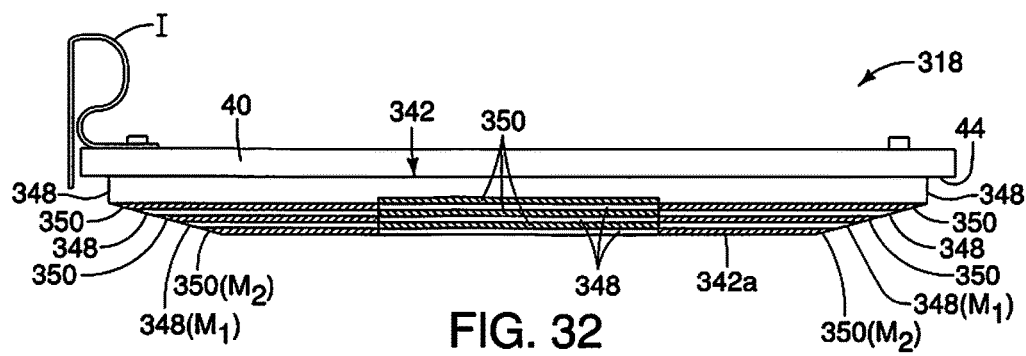
FIG. 32 is a side view of a brake pad having the backing plate and a brake lining in accordance with a seventh embodiment.

Referring now to FIG. 32, a brake pad 318 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the seventh embodiment, the brake pad 318 includes the backing plate 40 as described above in the first embodiment, and a brake lining 342. The backing plate 40 has the brake lining attachment surface 44, as described above in the first embodiment, defining the first plane $P_1$.

The brake lining 342 is attached to the brake lining attachment surface 44 and has a friction surface 332. As shown in FIG. 32, the brake lining 342 includes a first section 342a, a second section 342b and a third section 342c that are basically identical to the first section 242a", the second section 242b" and the third section 242c" of the sixth embodiment, except that there are no slots that would otherwise separate the first section 342a, the second section 342b and the third section 342c. In other words, the first section 342a abuts the second section 342b, and the second section 342b abuts the third section 342c.

The first section 342a, the second section 342b and the third section 342c each include a plurality of first layers 348 and a plurality of second layers 350 alternatingly arranged with each of the plurality of first layers 348 being sandwiched between adjacent ones of the plurality of second layers 350. As shown in FIG. 32, when newly manufactured (without wear) one of the first layers 348 of the second section 342b is exposed, at least partially defining a friction surface 332 of the brake lining 342. Further, one of the second layers 350 of the first section 342a is exposed, and one of the second layers 350 of the third section 342c is exposed, at least partially defining a friction surface 332 of the brake lining 342.

Referring now to FIGS. 33-40, a method of manufacturing the brake pads 218, 218', 218" and 318 will now be explained. For simplicity description of the method of manufacturing will be with specific reference to the brake pad 318. However it should be understood from the drawings and the description herein that the following description applies equally to each of the brake pads 218, 218', 218" and 318.

Figure 33:
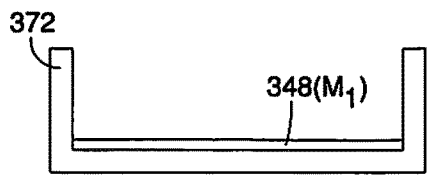
FIG. 33 is a side view of a mold with the first material loaded therein depicting one step in a method of manufacturing the brake lining, the first material subsequently defining a first layer of the brake lining in accordance with the seventh embodiment.
Figure 34:
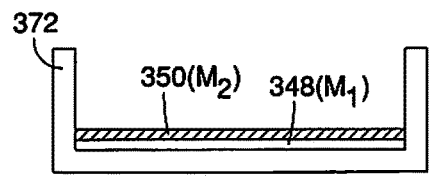
FIG. 34 is another side view of the mold similar to FIG. 33 with the second material being loaded therein over the first material, the second material subsequently defining a second layer of the brake lining in accordance with the seventh embodiment.
Figure 35:
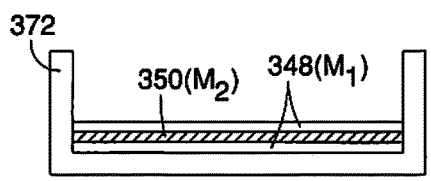
FIG. 35 is another side view of the mold similar to FIG. 34 with the first material being loaded therein over the second material, the first material subsequently defining a third layer of the brake lining in accordance with the seventh embodiment.

As shown in FIG. 33, a mold 372 is provided in order to provide shape and dimension to a first puck that is to be formed therein. First, a predetermined amount of the first material $M_1$ is put into the mold 372 and allowed to at least partially dry and/or partially cure. The first material $M_1$ shown in FIG. 33 forms a first layer 348 of the puck. Next as shown in FIG. 34, a predetermined amount of the second material $M_2$ is put into the mold 372 on top of the first material $M_1$ and allowed to at least partially dry and/or partially cure. The second material $M_2$ shown in FIG. 34 forms a second layer 350 of the first puck. Next as shown in FIG. 35, another predetermined amount of the first material $M_2$ is put into the mold 372 on top of the layer of the second material $M_2$ and allowed to at least partially dry and/or partially cure. The first material $M_1$ shown in FIG. 35 forms another first layer 348 of the first puck. Alternating layers of the first and second materials $M_1$ and $M_2$ are added to the mold 372 as needed until a predetermined number of alternating first layers 348 and second layers 350 are added to the mold 372, as shown in FIG. 36.

Figure 36:
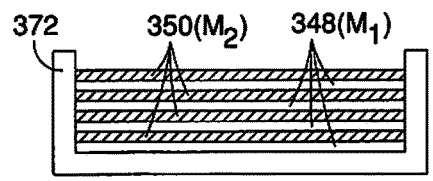
FIG. 36 is another side view of the mold similar to FIG. 35 with subsequent layers of the first material and the second material alternatingly arranged within the mold subsequently defining a first portion of the brake lining in accordance with the seventh embodiment.

The first puck shown in FIG. 36 can thereafter be fully heated (baked) and cured to achieve a desired hardness. Thereafter, the first puck of alternating first layers 348 and second layers 350 can be cut and/or shaped as needed. The first puck can thereafter be used to define the second section 342b of the brake lining 342 of the brake pad 318, with one of the first layers 348 being exposed to at least partially define the friction surface 332.

Figure 37:
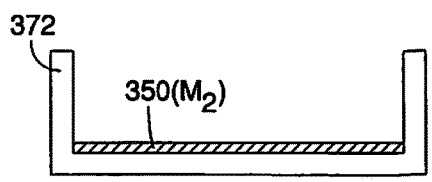
FIG. 37 is a side view of the mold with the second material loaded therein depicting another step in the method of manufacturing the brake lining, the second material subsequently defining a layer of the brake lining in accordance with the seventh embodiment.
Figure 38:
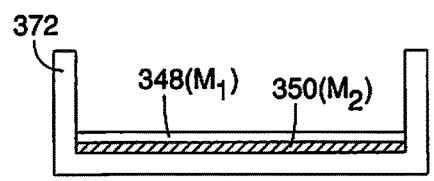
FIG. 38 is another side view of the mold similar to FIG. 37 with the first material being loaded therein over the second material, the first material subsequently defining another layer of the brake lining in accordance with the seventh embodiment.
Figure 39:
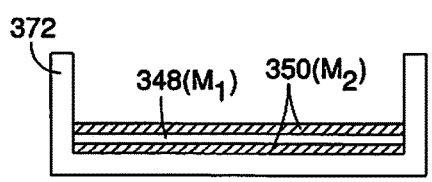
FIG. 39 is another side view of the mold similar to FIG. 38 with the second material being loaded therein over the first material and subsequently defining yet another layer of the brake lining in accordance with the seventh embodiment.

Simultaneously, as shown in FIG. 37, another of the molds 372 is provided in order form a second puck. First, a predetermined amount of the second material $M_2$ is put into the mold 372 and allowed to at least partially dry and/or partially cure. The second material $M_2$ shown in FIG. 37 forms one of the second layers 350 of the second puck. Next as shown in FIG. 38, a predetermined amount of the first material $M_1$ is put into the mold 372 on top of the second material $M_2$ and allowed to at least partially dry and/or partially cure. The first material $M_1$ shown in FIG. 38 forms one of the first layers 348 of the second puck. Next as shown in FIG. 39, yet another predetermined amount of the second material $M_1$ is put into the mold 372 on top of the layer of the first material $M_1$ and allowed to at least partially dry and/or partially cure. The second material $M_2$ shown in FIG. 39 forms another second layer 350 of the second puck. Further alternating layers of the first and second materials $M_1$ and $M_2$ are added to the mold 372 as needed until a predetermined number of alternating second layers 350 and first layers 348 are added to the mold 372, as shown in FIG. 40.

Figure 40:
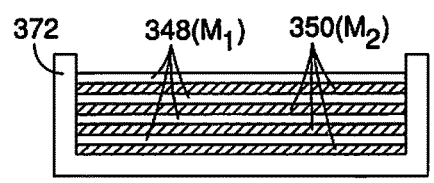
FIG. 40 is another side view of the mold similar to FIG. 39 with subsequent layers of the second material and the first material alternatingly arranged within the mold subsequently defining a second portion of the brake lining in accordance with the seventh embodiment.

The second puck shown in FIG. 40 can thereafter be fully heated (baked) and cured to achieve a desired hardness. Thereafter, the second puck of alternating ones of the second layers 350 and the first layers 348 can be cut and/or shaped as needed. The second puck can thereafter be used to define the first section 342*a* and/or the third section 342*c* of the brake lining 342 of the brake pad 318, with one of the second layers 350 being exposed to at least partially define the friction surface 332.

As shown in FIG. 32, the brake lining 342 of the brake pad 318 is manufactured from at least a portion of one of the first pucks and two of the second pucks, as made in the process described with respect to FIGS. 33-40. In the assembled brake lining 342, the first layers 348 of the second section 342*b* align and are co-planar with adjacent ones of the second layers 350 of each of the first section 342*a* and the third section 342*c*. Similarly, the second layers 350 of the second section 342*b* align and are co-planar with adjacent ones of the first layers 348 of each of the first section 342*a* and the third section 342*c*.

Hence, in accordance with the above described steps depicted in FIGS. 33-40, a first puck and a second puck are formed in the molds 372. The first puck is formed beginning with a measured amount of the first material $M_1$ to form a first one of the plurality of first layers 348. Next, a measured amount of the second material $M_2$ overlays the first one of the plurality of first layers 348 to form a first one of the plurality of second layers 350. Further, another measured amount of the first material $M_1$ overlays the first one of the plurality of second layers 350 to form a second one of the plurality of second layers 348. The process continues until a desired number of layers are formed. Thereafter, the first puck is heat cured and thereafter the surfaces are conditioned. The second puck is formed in a similar manner, but begins with the second material $M_2$.

In the embodiment depicted in FIG. 32, the brake lining 342 is formed such that the first section 342*a* and the second section 342*b* abut one another when attached to the backing plate 40. Further, the second section 342*b* and the third section 342*c* abut one another when attached to the backing plate 40.

However, as shown in FIGS. 27-30 and demonstrated in the brake pads 218, 218' and 218", the brake lining 342 of the brake pad 318 can be formed with one or more slots, such at the slots 56 and 58 or the single slot 60, as described above.

It should be understood from the drawings and the description above that the first material $M_1$ and the second material $M_2$ have the same properties and effects in the seventh embodiment as in the above described embodiments. Therefore, further description of the first material $M_1$ and the second material $M_2$ is not repeated here, for the sake of brevity.

Eight Embodiment

Figure 41:
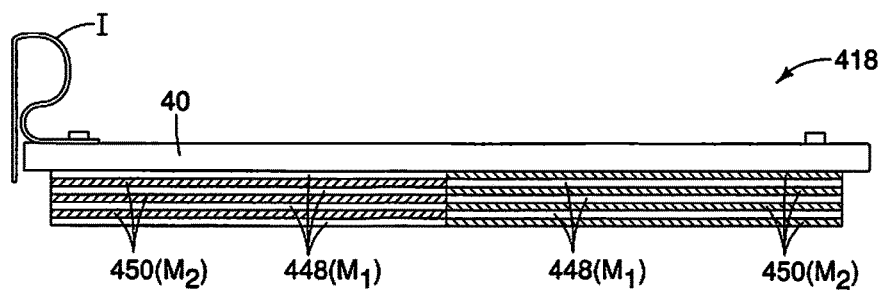
FIG. 41 is a side view of a brake pad having a baking plate and a brake lining in accordance with an eighth embodiment.
Figure 42:
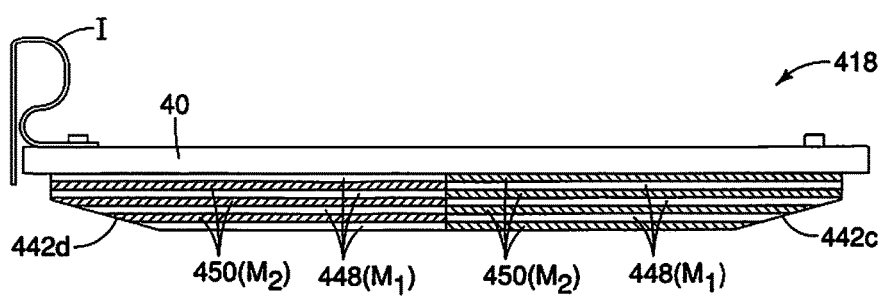
FIG. 42 is another side view of the brake pad shown in FIG. 41 further processed to include angled surface sections in accordance with the eighth embodiment.
Figure 43:
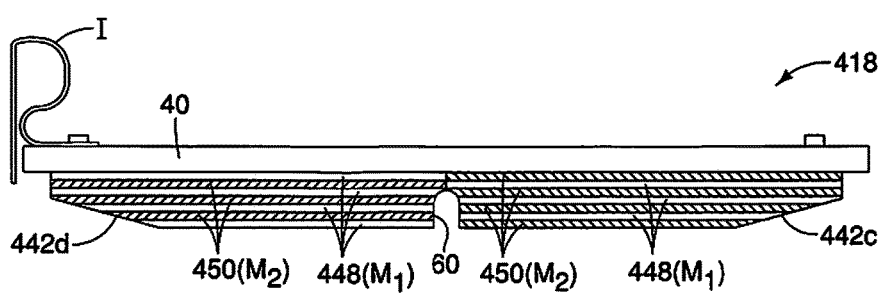
FIG. 43 is yet another side view of the brake pad shown in FIGS. 41 and 42 further processed to include a slot between sections of the brake lining in accordance with the eighth embodiment.

Referring now to FIG. 41-43, a brake pad 418 in accordance with an eighth embodiment will now be explained. In view of the similarity between the first, seventh and eighth embodiments, the parts of the eighth embodiment that are identical to the parts of the first and the seventh embodiments will be given the same reference numerals as the parts of the first an seventh embodiments. Moreover, the descriptions of the parts of the eighth embodiment that are identical to the parts of the first and seventh embodiments may be omitted for the sake of brevity.

The brake pad 418 includes the backing plate 40 (described above) and a brake lining 442. The brake lining 442 includes only two section, a first section 442*a* and a second section 442*b*. The first section 442*a* is formed in a manner consistent with the description above with respect to the first section 342*a* of the brake pad 318. Similarly, second section 442*b* is formed in a manner consistent with the description above with respect to the second section 342*b* of the brake pad 318. Specifically, each of the first section 442*a* and the second section 442*b* are formed with alternating ones of a plurality of first layers 448 of the first material $M_1$ and alternating ones of a plurality of second layers 450 of the second material $M_2$. For the first section 442*a*, one of the second layers 450 is exposed to at least partially define the friction surface 432. For the second section 442*b*, one of the first layers 448 is exposed to at least partially define the friction surface 432. Hence, both the first material $M_1$ and the second material $M_2$ are exposed to define the friction surface 432.

The first section 442*a* and the second section 442*b* are attached to the backing plate 40 such that they abut one another. Thereafter, as shown in FIG. 42, the brake lining 442 can optionally be shaped to form angled sections 442*c* and 442*d*. Further, as shown in FIG. 43, a slot 60 can optionally be formed in the brake lining 442 extending from the friction surface 432 to adjacent the backing plate 40, thereby at least partially separating the first section 442*a* and the second section 442*b*.

Ninth Embodiment

Figure 44:
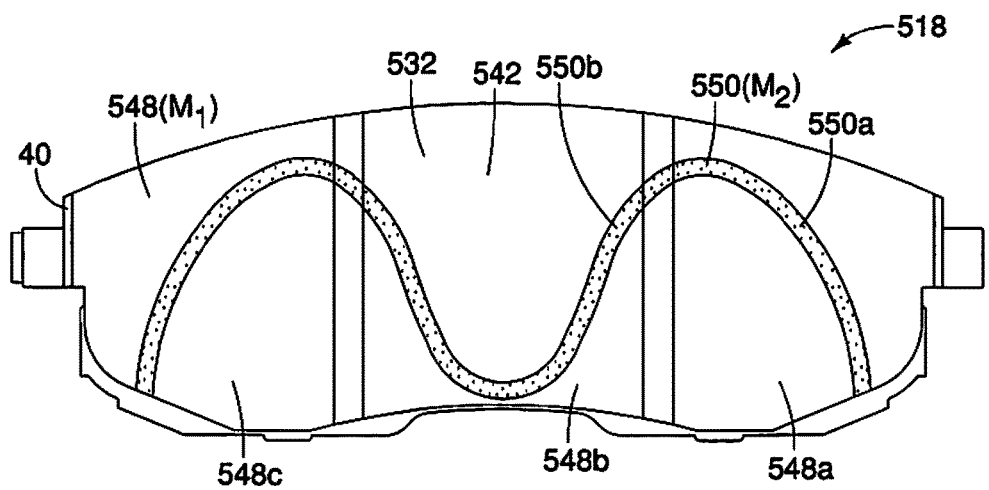
FIG. 44 is a side view of a brake pad having a baking plate and a brake lining in accordance with a ninth embodiment.

Referring now to FIG. 44, a brake pad 518 in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

The brake pad 518 includes the backing plate 40 and a brake lining 542. The brake lining 542 has a first portion 548 made of the first material $M_1$ and a second portion 550 made of the second material $M_2$. The first portion 548 defines almost the entire brake lining 542. A sinusoidal slot is formed in the first portion 548 and is filled with the second material $M_2$ thereby defining the second portion 550. Hence, the second portion 550 has an overall sinusoidal shape as viewed from the front of the brake pad 518 looking at the friction surface 532.

The brake lining 542 has a first section 542a, a second section 542b and a third section 542c. The first section 542a includes a first area 550a of the second portion 550 (the second material $M_2$). The second section 542b includes a second area 550b of the second portion 550, and the third section 542c includes a third area 550c of the second portion 550 (the second material $M_2$).

Tenth Embodiment

Figure 45:
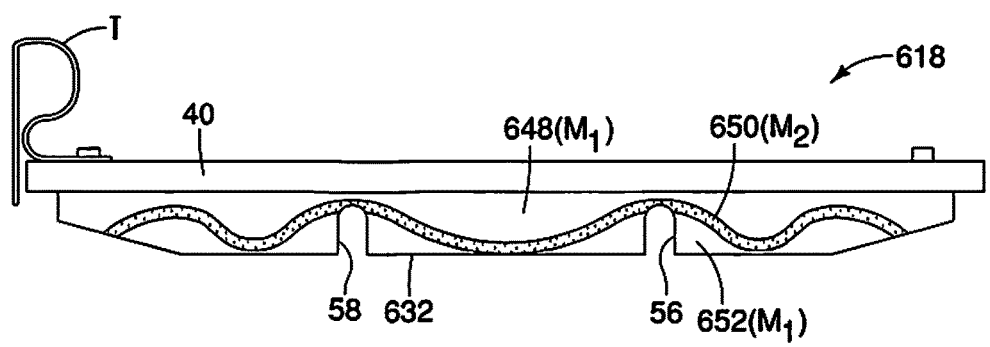
FIG. 45 is a side view of a brake pad having a baking plate and a brake lining in accordance with a tenth embodiment.

Referring now to FIG. 45, a brake pad 618 in accordance with a tenth embodiment will now be explained. In view of the similarity between the first and tenth embodiments, the parts of the tenth embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

The brake pad 618 includes the backing plate 40 and a brake lining 642. The brake lining 642 has a first layer 648 made of the first material $M_1$, a second layer 650 made of the second material $M_2$ and a third layer 652 made of the first material $M_1$.

The first layer 648 is directly attached to the backing plate 40, but includes a sinusoidal surface, shown from the side in FIG. 45. The second layer 650 overlays the sinusoidal surface covering the entire first layer 648. The third layer 652 overlays the second layer 650 and initially defines the friction surface 632. However, as the brake lining 642 experiences wear, portions of the second layer 650 become exposed and contact the surfaces of the brake rotor 16. The irregular shape of the second layer 650 provides a differing level of abrasiveness during the life of the brake pad 618.

The vehicle elements, components and structures, as well as the brake assembly elements (other than the brake pads described above) are conventional components that are well known in the art. Since such vehicle and brake components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the brake pad. Accordingly, these terms, as utilized to describe the present invention should be interpreted relative to a vehicle equipped with the brake pad.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A brake pad, comprising:
   a backing plate having a brake lining attachment surface; and
   a brake lining having a first side attached to the brake lining attachment surface and a second side that defines a friction surface, the brake lining having a first section and a second section;
   the first section including a plurality of first layers, each of the plurality of first layers having a first material, and a plurality of second layers having a second material, the plurality of first layers and the plurality of second layers extending in directions parallel to the brake lining attachment surface, the plurality of first layers and the plurality of second layers being alternatingly arranged with each of the plurality of first layers being sandwiched between adjacent ones of the plurality of second layers, the first material being different from the second material, and in an unworn state one of the plurality of first layers defines a first portion of the friction surface; and
   the second section including a plurality of third layers, each of the plurality of third layers having the second material, and a plurality of fourth layers, each of the plurality of fourth layers having the first material, the plurality of third layers and the plurality of fourth layers being alternatingly arranged with each of the plurality of fourth layers being sandwiched between adjacent ones of the plurality of third layers such that ones of the plurality of first layers adjacent to corresponding ones of plurality of third layers are co-planar with one another and ones of the plurality of second layers adjacent to corresponding ones of plurality of fourth layers are co-planar with one another, and in the unworn state one of the plurality of third layers defines a second portion of the friction surface.

2. The brake pad according to claim 1, wherein each the plurality of first layers, each the plurality of second layers, each of the plurality of third layers and each of the plurality of fourth layers have the same thickness.

3. The brake pad according to claim 1, wherein each of the plurality of first layers, the plurality of second layers, the plurality of third layers and the plurality of fourth layers include at least one surface that is planar.

4. The brake pad according to claim 1, wherein the first material is non-asbestos organic material that includes a mixture fiber materials and binding materials.

5. The brake pad according to claim 4, wherein the first material further includes at least one selected from a group of materials consisting of glass, rubber, carbon and Kevlar.

6. The brake pad according to claim 1, wherein the second material has metal content.

7. The brake pad according to claim 6, wherein the metal content includes a metal, friction modifiers, graphite lubricant and filler material, the metal being at least one selected from a group consisting of steel, iron and copper.

8. The brake pad according to claim 1, wherein the first section and the second section abut one another.

9. The brake pad according to claim 1, wherein the brake lining includes a slot formed therein that extends from the friction surface toward the brake lining attachment surface, the slot being located between the first section and the second section such that the first second and the second section are spaced apart from one another.

10. The brake pad according to claim 9, wherein the brake lining includes a second slot that extends from the friction surface toward the brake lining attachment surface, and a third section with the second slot being located between the second section and the third section,
the third section including a plurality of fifth layers, each of the plurality of fifth layers having the first material, and a plurality of sixth layers, each of the plurality of sixth layers having the second material, the plurality of fifth layers and the plurality of sixth layers being alternatingly arranged with each of the plurality of fifth layers being sandwiched between adjacent ones of the plurality of sixth layers such that the ones of the plurality of first layers and corresponding ones of plurality of fifth layers are co-planar with one another and the ones of the plurality of second layers and corresponding ones of plurality of sixth layers are co-planar with one another and in an unworn state one of the plurality of fifth layers defines a third portion of the friction surface.

11. The brake pad according to claim 1, wherein the first material provides braking friction in response to contact with a metal braking rotor, and
the second material provides abrasiveness in response to contact with the metal braking rotor.

12. A method of manufacturing a brake pad comprising:
assembling a first section of a brake lining with a plurality of first layers, each of the plurality of first layers having a first material, and a plurality of second layers having a second material, the plurality of first layers and the plurality of second layers being alternatingly stacked with respect to each other such that the plurality of first layers are sandwiched between adjacent ones of the plurality of second layers, the first material being different from the second material;
assembling a second section of the brake lining with a plurality of third layers, each of the plurality of third layers having the second material, and a plurality of fourth layers, each of the plurality of fourth layers including the first material, the plurality of third layers and the plurality of fourth layers being alternatingly stacked with respect to each other such that of the plurality of fourth layers are sandwiched between adjacent ones of the plurality of third layers; and attaching the first section and the second section to a brake lining attachment surface of a backing plate, such that ones of the plurality of first layers adjacent to corresponding ones of plurality of third layers are co-planar with one another and ones of the plurality of second layers adjacent to corresponding ones of plurality of fourth layers are co-planar with one another and the plurality of first layers, the plurality of second layers, the plurality of third layers and the plurality of fourth layers extend in directions parallel to the brake lining attachment surface, and in an unworn state one of the plurality of first layers defines a first portion of the friction surface and one of the plurality of third layers defines a second portion of the friction surface.

13. The method of manufacturing a brake pad according to claim 12, further comprising:
forming a first puck in a first mold beginning with a measured amount of the first material to form a first one of the plurality of first layers,
overlaying a measured amount of the second material over the first one of the plurality of first layers to form a first one of the plurality of second layers,
overlaying another measured amount of the first material over the first one of the plurality of second layers to form a second one of the plurality of second layers,
overlaying another measured amount of the second material over the second one of the plurality of first layers to form a second one of the plurality of second layers,
heat curing the first puck, and
surface conditioning the first puck to form the first section of the brake lining.

14. The method of manufacturing a brake pad according to claim 13, further comprising:
forming a second puck in a second mold beginning with a measured amount of the second material to form a first one of the plurality of third layers,
overlaying a measured amount of the first material over the first one of the plurality of third layers to form a first one of the plurality of fourth layers,
overlaying another measured amount of the second material over the first one of the plurality of fourth layers to form a second one of the plurality of third layers,
overlaying another measured amount of the first material over the second one of the plurality of third layers to form a second one of the plurality of fourth layers,
heat curing the second puck, and
surface conditioning the second puck to form the second section of the brake lining.

15. The method of manufacturing a brake pad according to claim 12, wherein
the attaching of the first section and the second section to the backing plate includes abutting the first section to the second section.

16. The method of manufacturing a brake pad according to claim 12, wherein
   the attaching of the first section and the second section to the backing plate includes spacing the first section apart from the second section thereby forming a slot between the first section and the second section.

17. The method of manufacturing a brake pad according to claim 12, wherein
   the first material provides braking friction in response to contact with a metal braking rotor, and
   the second material provides abrasiveness in response to contact with the metal braking rotor.

18. The method of manufacturing a brake pad according to claim 12, wherein
   the first material is a non-asbestos organic material includes a mixture fiber materials and binding materials, the fiber materials being at least one selected from a group consisting of glass, rubber, carbon and Kevlar; and
   the second material has a metal content containing 30-65% metal by weight combined with friction modifiers, a graphite lubricant and filler material, the metal content being at least one selected from a group consisting of steel, iron, and copper.

* * * * *